United States Patent Office 2,778,837
Patented Jan. 22, 1957

2,778,837
NEW ANTHRAQUINONE VAT DYESTUFFS

Theodor Holbro, Basel, Switzerland, assignor to Ciba Limited, Basel, Switzerland, a firm of Switzerland No Drawing. Application July 6, 1954,
Serial No. 441,635

Claims priority, application Switzerland July 29, 1953

5 Claims. (Cl. 260—316)

This invention provides valuable new anthraquinone vat dyestuffs which, like, for example, the dyestuff of the constitution (1) 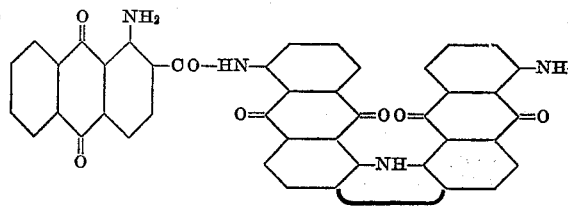

correspond to the general formula (2) 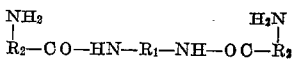

in which —NH—R$_1$—NH— represents the radical of a 5:5′-diamino-1:1′-dianthrimide-carbazole, and R$_2$ represents an anthraquinone radical to which the —NH$_2$ group is bound in the 1-position and the —CO— group in the 2-position.

The invention also provides a process for making the above dyestuffs, wherein a 5:5′-diamino-1:1′-dianthrimide-carbazole is reacted with an anthraquinone 2-carboxylic acid or a functional derivative thereof which contains in the 1-position an amino group or a substituent convertible into an amino group, and, when necessary, the latter substituent is converted into an amino group.

As a starting material, which provides the radical —HN—R$_1$—NH—, there is advantageously used 5:5′-diamino-1:1′-dianthrimide-carbazole itself. As a starting material introducing the acyl radical of the constitution H$_2$N—R$_2$—CO— there is advantageously used a reactive functional derivative of a 1-aminoanthraquinone-2-carboxylic acid or of an anthraquinone-2-carboxylic acid which contains in the 1-position a substituent convertible into an amino group, for example, a halogen atom or a nitro group. If desired, these compounds may contain further substituents, for example, additional nitro groups or halogen atoms, nitrile groups, alkoxy groups or acylamino groups. Among the reactive functional derivatives of such carboxylic acids the acid halides, and above all the acid chlorides, yield especially good results. As examples there may be mentioned the halides of the following acids:

1-aminoanthraquinone-2-carboxylic acid,
1-amino-4-chloranthraquinone-2-carboxylic acid,
1-amino-4-nitroanthraquinone-2-carboxylic acid,
1-amino-4-cyanoanthraquinone-2-carboxylic acid,
1-nitroanthraquinone-2-carboxylic acid, and
1-chloranthraquinone-2-carboxylic acid.

The reaction of the 5:5′-diamino-1:1′-dianthrimide is advantageously carried out in a solvent or diluent, preferably one of high boiling point such as monochlorobenzene, di- or tri-chlorobenzenes, nitrobenzene or naphthalene, at a raised temperature, for example, between about 100° C. and the boiling point of the solvent or diluent used.

When it is necessary to convert in the resulting products into amino groups substituents present in the 1-position of the radical R$_2$, this conversion may be carried out by methods in themselves known. For example, nitro groups are advantageously converted into amino groups by vatting the dyestuff in an aqueous alkaline medium with a quantity of sodium hydrosulfite sufficient also to

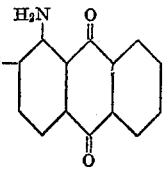

reduce the nitro groups, and isolating the product in the usual manner, for example, by introducing air to precipitate the product from the vat, or by treating the dyestuff with ammonia or an agent yielding ammonia, for example, in nitrobenzene at a raised temperature.

If desired, the dyestuffs so obtained may be subjected to further reactions. Thus, for example, they may be treated with halogenating agents or, when they contain reactive substituents, further reactions may be carried out with these substituents. For example, nitro groups in the 4-position of the radical R$_2$ may be reduced and the resulting amino groups, which are considerably more reactive than those in the 1-position, may be acylated, for example, benzoylated.

The new vat dyestuffs corresponding to the Formula 2 above, if desired, after further treatment in the manner described above, can be used in known manner as such or in the form of their leuco-ester salts obtainable by known methods, for dyeing or printing a very wide variety of fibers, for example, animal fibers and especially vegetable fibers, and therefore for dyeing or printing wool or silk, and advantageously cotton, linen, artificial silk or staple fibers of regenerated cellulose and also polyamide fibers. The dyeings and prints produced on various fibers are of very similar to identical tints and are distinguished by very good properties of fastness.

The following examples illustrate the invention, the parts and percentages being by weight unless otherwise stated and the relationship of parts by weight to parts by volume being the same as that of the kilogram to the liter:

*Example 1*

45.7 parts of 5:5′-diamino-1:1′-dianthrimide-carbazole and 65 parts of 1-nitroanthraquinone-2-carboxylic acid chloride are stirred in 1080 parts of dry nitrobenzene for 2 hours at 140–150° C. and then for 3 hours at 150–160° C. The mixture is then cooled, and the reaction product is filtered off with suction, washed with nitrobenzene and freed from adherent solvent by steam distillation. After being filtered and dried, the reaction product is obtained in excellent yield in the form of an orange brown powder.

101.5 parts of the dinitro-compound so obtained, after being pasted with 162 parts of ethanol, are stirred with 7000 parts of water at 50° C. and, after the addition of 1350 parts of sodium hydroxide solution of 30 percent strength and 508 parts of sodium hydrosulfite, the product is vatted for one hour at 50–55° C. After this reduction air is introduced and the precipitated dyestuff is filtered off, washed and dried. There is obtained in quantitative yield a dark powder which dissolves in sulfuric acid with a violet coloration and dyes cotton from a red-brown vat very fast red tints.

*Example 2*

45.7 parts of 5:5'-diamino-1:1'-dianthrimide-carbazole and 62 parts of 1-amino-anthraquinone-2-carboxylic acid chloride are heated in 1080 parts of dry nitrobenzene in the course of 2 hours up to 150° C., and stirred for a further 4 hours at 150–160° C. After cooling the mixture, the dyestuff formed is filtered off with suction and worked up as described in the first paragraph of Example 1. There is obtained in this manner in excellent yield a product corresponding to the dyestuff described in the second paragraph of Example 1.

By using instead of 1-aminoanthraquinone-2-carboxylic acid chloride, 1-amino-4-cyanoanthraquinone-2-carboxylic acid chloride, there is obtained a product which dyes cotton from a red-brown vat pure orange-red tints.

By using 1-amino-4-bromanthraquinone-2-carboxylic acid a dyestuff is obtained which dyes cotton from an orange-brown vat somewhat more brownish red tints than those of the dyestuff described in the first paragraph.

By reacting 5:5'-diamino-1:1'-dianthrimide-carbazole with 1-amino-4-nitroanthraquinone-2-carboxylic acid chloride in the manner described above, reducing the resulting product by vatting and reprecipitating it, and acylating the product with 2 mols of benzoyl chloride, there is obtained a dyestuff which dyes cotton from a violet-brown vat brown tints.

*Example 3*

45.7 parts of 5:5'-diamino-1:1-dianthrimide-carbazole and 67 parts of 1-chloranthraquinone-2-carboxylic acid chloride are stirred in 1800 parts of dry nitrobenzene for 4 hours at 150–160° C. The reaction product is filtered off with suction at 100° C., washed with nitrobenzene, and freed from adherent solvent by steam distillation. After filtering and drying the reaction product, it is obtained in very good yield in the form of a brownish orange powder which dissolves in concentrated sulfuric acid with an olive coloration and dyes cotton from an orange-brown vat yellow tints.

100 parts of the product so obtained are introduced into a mixture, which has previously been stirred for ½ hour at 170° C., of 72 parts of para-toluene sulfonamide and 41 parts of potassium carbonate in 1000 parts of nitrobenzene, and, after the addition of 2 parts of cuprous chloride, the whole is stirred for 15 hours at 180–185° C. The mixture is then cooled, diluted at 70° C. with ethanol, the reaction product is filtered off with suction, washed with ethanol to remove the solvent, and freed from cuprous chloride by boiling it with dilute hydrochloride acid. After being filtered off, washed and dried, the reaction product is obtained in very good yield in the form of an ochre-colored powder which dissolves in concentrated sulfuric acid with a violet coloration.

30 parts of the resulting product are introduced at 20° C. into 450 parts of sulfuric acid of 92.5 percent strength, and the whole is stirred for 40 minutes at 35–40° C. The mixture is then poured on to 5000 parts of ice water, and the precipitated dyestuff is filtered off with suction, washed neutral with water and dried. The dyestuff is obtained in excellent yield and corresponds in its properties to the dyestuff described in the second paragraph of Example 1.

*Example 4*

1 part of the dyestuff of Example 1 is well pasted with 8 parts by volume of sodium hydroxide solution of 30 percent strength and 200 parts of water at 25–30° C., 2 parts of sodium hydrosulfite are then added, and vatting is carried on for ½ hour at 50° C. The solution is poured into a solution of 2 parts by volume of sodium hydroxide solution of 30 percent strength and 1 part of sodium hydrosulfite in 1800 parts of water. 100 parts of cotton are dyed in the resulting bath for one hour at 40–50° C. After ¼ hour, dyeing is carried out by the addition of 20 parts of sodium chloride or anhydrous sodium sulfate. The material is then squeezed, oxidized in the air, rinsed, and developed at the boil for ½ hour in a solution which contains in 1000 parts by volume of water 5 parts of soap and 2 parts of anhydrous sodium carbonate. The cotton is dyed a fast red tint.

*Example 5*

30 parts of the dyestuff described in Example 1, 140 parts of water, 600 parts of potassium carbonate thickening, 30 parts of sodium hydroxide solution of 30 percent strength and 20 parts of sodium formaldehyde sulfoxylate are mixed together, heated to 50° C. and then ground. By the addition of a further 80 parts of sodium formaldehyde sulfoxylate and 100 parts of urea, there is obtained a paste ready for printing. Cotton or other vegetable fibers can be printed in the normal manner with this paste. After being printed the material is dried, steamed for 8 minutes, rinsed with a solution containing per liter of water 3 grams of sodium perborate and 2 grams of acetic acid of 40 percent strength, oxidized for 5 minutes, rinsed, soaped at the boil, again rinsed, and dried. In this manner a very fast brick red print is produced.

What is claimed is:
1. An anthraquinone vat dyestuff of the formula

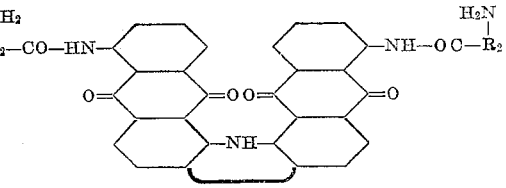

in which $R_2$ represents an anthraquinone radical bound to the —$NH_2$ group in its 1-position and to the —CO— group in 2-position and containing at the most one further substituent which is in 4-position of the anthraquinone radical and is selected from the group consisting of hydrogen and halogen atoms and nitro, nitrile and benzoylamino groups.

2. The anthraquinone vat dyestuff of the formula

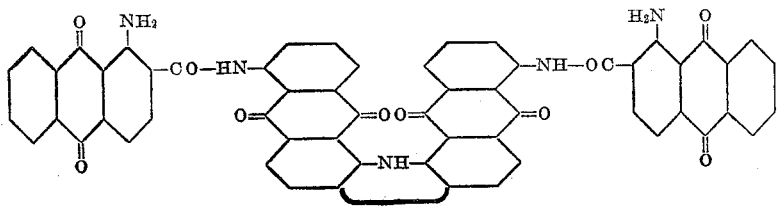

3. The anthraquinone vat dyestuff of the formula
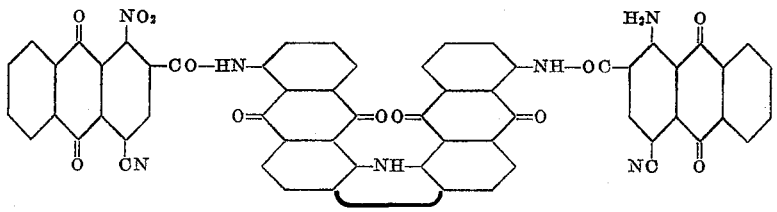
4. The anthraquinone vat dyestuff of the formula
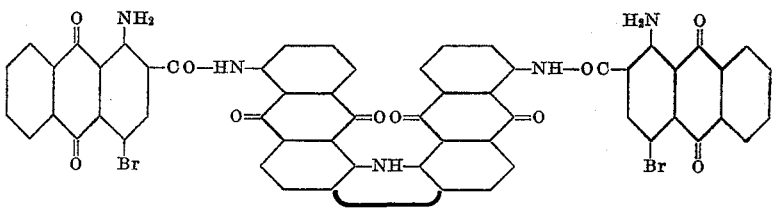
5. The anthraquinone vat dyestuff of the formula
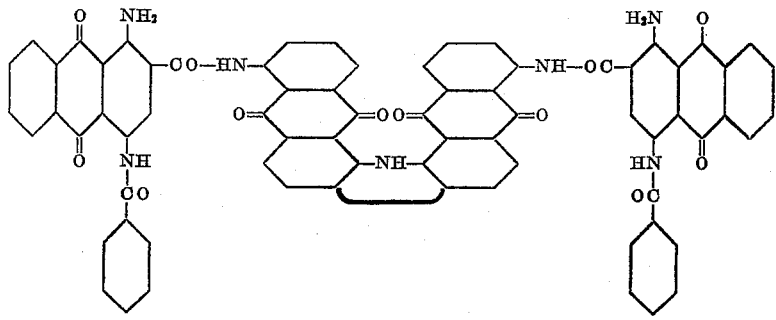
References Cited in the file of this patent
UNITED STATES PATENTS
| | | |
|---|---|---|
| 1,819,014 | Baumann | Aug. 18, 1931 |
| 2,567,822 | Moergeli | Sept. 11, 1951 |
FOREIGN PATENTS
| | | |
|---|---|---|
| 580,642 | Great Britain | Sept. 6, 1946 |
OTHER REFERENCES
"Das Anthrencen und die Anthrachinone," Houben, Georg Thieme. Pub. Leipzig (1929), pp. 497–501.